United States Patent
Goto et al.

(10) Patent No.: US 8,078,186 B2
(45) Date of Patent: Dec. 13, 2011

(54) TRANSMISSION RATE CONTROL METHOD AND RADIO BASE STATION

(75) Inventors: Yoshikazu Goto, Yokohama (JP);
Akihito Hanaki, Yokohama (JP);
Takahiro Hayashi, Yokosuka (JP);
Junichiro Kawamoto, Tokyo (JP);
Yukiko Takagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 520 days.

(21) Appl. No.: 12/356,685

(22) Filed: Jan. 21, 2009

(65) Prior Publication Data

US 2009/0191886 A1 Jul. 30, 2009

(30) Foreign Application Priority Data

Jan. 24, 2008 (JP) ................ P2008-014027

(51) Int. Cl.
*H04W 72/00* (2009.01)
(52) U.S. Cl. .............. 455/452.1; 455/550.1; 455/509; 370/329
(58) Field of Classification Search ....... 455/450–452.2, 455/509; 370/329–330
See application file for complete search history.

(56) References Cited

U.S. PATENT DOCUMENTS

| | | | |
|---|---|---|---|
| 2006/0215604 A1* | 9/2006 | Mueckenheim et al. | 370/329 |
| 2007/0049309 A1* | 3/2007 | Pan et al. | 455/509 |
| 2008/0139133 A1 | 6/2008 | Usuda et al. | |
| 2009/0124257 A1* | 5/2009 | Karlsson et al. | 455/435.1 |

FOREIGN PATENT DOCUMENTS

| | | |
|---|---|---|
| JP | 2007-267070 A | 10/2007 |
| JP | 2007-274322 A | 10/2007 |
| JP | 2008-514033 A | 5/2008 |
| JP | 2008-182734 A | 8/2008 |
| WO | 2006/095871 A1 | 9/2006 |

OTHER PUBLICATIONS

3GPP TS 25.321 V7.5.0 (Jun. 2007), 3rd Generation Partnership Project; Technical Specification Group Radio Access Network; Medium Access Control(MAC)protocol specification(Release 7), 141 pages.
3GPP TS 25.212 V7.0.0 (200-03), 3rd Generation Partnership Project; Technical Specification Group Radio Access Network; Multiplexing and channel coding (FDD)(Release 7), 84 pages.

* cited by examiner

*Primary Examiner* — Vladimir Magloire
(74) *Attorney, Agent, or Firm* — Marvin A. Motsenbocker; Mots Law, PLLC (57) ABSTRACT

A transmission rate control method according to the present invention includes: determining, at the radio base station NodeB, a maximum granted value that can be notified to the mobile station UE, in accordance with the happy bit notified from the mobile station UE; calculating, at the radio base station NodeB, as an allowable value to be notified to the mobile station UE, a granted value not more than the maximum granted value; notifying, from the radio base station NodeB to the mobile station UE, the granted value calculated at the radio base station NodeB, by using a transmission rate control channel; and transmitting, from the mobile station UE, the uplink user data, at a transmission rate corresponding to the granted value notified from the radio base station NodeB.

16 Claims, 7 Drawing Sheets

| AVERAGE VALUE OF HAPPY BIT | MAXIMUM AG VALUE OF AG |
|---|---|
| 1 | $(15/15)^2$ |
| 0.9 | $(24/15)^2$ |
| 0.8 | $(30/15)^2$ |
| ⋮ | ⋮ |
| 0 | $(150/15)^2 \times 6$ |

| AG | Index |
|---|---|
| $(168/15)^2 \times 6$ | 31 |
| $(150/15)^2 \times 6$ | 30 |
| $(168/15)^2 \times 4$ | 29 |
| $(150/15)^2 \times 4$ | 28 |
| $(134/15)^2 \times 4$ | 27 |
| $(119/15)^2 \times 4$ | 26 |
| $(150/15)^2 \times 2$ | 25 |
| $(95/15)^2 \times 4$ | 24 |
| $(168/15)^2$ | 23 |
| $(150/15)^2$ | 22 |
| $(134/15)^2$ | 21 |
| $(119/15)^2$ | 20 |
| $(106/15)^2$ | 19 |
| $(95/15)^2$ | 18 |
| $(84/15)^2$ | 17 |
| $(75/15)^2$ | 16 |
| $(67/15)^2$ | 15 |
| $(60/15)^2$ | 14 |
| $(53/15)^2$ | 13 |
| $(47/15)^2$ | 12 |
| $(42/15)^2$ | 11 |
| $(38/15)^2$ | 10 |
| $(34/15)^2$ | 9 |
| $(30/15)^2$ | 8 |
| $(27/15)^2$ | 7 |
| $(24/15)^2$ | 6 |
| $(19/15)^2$ | 5 |
| $(15/15)^2$ | 4 |
| $(11/15)^2$ | 3 |
| $(7/15)^2$ | 2 |
| ZERO_GRANT * | 1 |
| INACTIVE * | 0 |

TRANSMISSION RATE CONTROL METHOD AND RADIO BASE STATION

CROSS REFERENCE TO RELATED APPLICATION

This application is based upon and claims the benefit of priority from prior Japanese Patent Application No. 2008-014027, filed on Jan. 24, 2008; the entire contents of which are incorporated herein by reference.

BACKGROUND OF THE INVENTION

1. Field of the Invention

The present invention relates to a transmission rate control method, a mobile communication system and a radio base station, which control a transmission rate of uplink user data to be transmitted from a mobile station.

2. Description of the Related Art

In a conventional mobile communication system, when setting a dedicated channel, a radio network controller is configured to determine a transmission rate of uplink user data, in consideration of a radio resource of a radio base station, an amount of an interference in the uplink, a transmission power of a mobile station, a transmission processing performance of the mobile station, a transmission rate required for an upper application, and the like; and to notify the determined transmission rate of the uplink user data by a layer 3 (radio resource control layer) message to both of the mobile station and the radio base station.

Here, the radio network controller is provided at an upper level of the radio base station, and is an apparatus configured to control the radio base station and the mobile station.

In general, data communications often cause burst traffic compared with voice communications or TV communications. Therefore, it is preferable that a transmission rate of a channel used for the data communications is changed fast.

Figure 1:
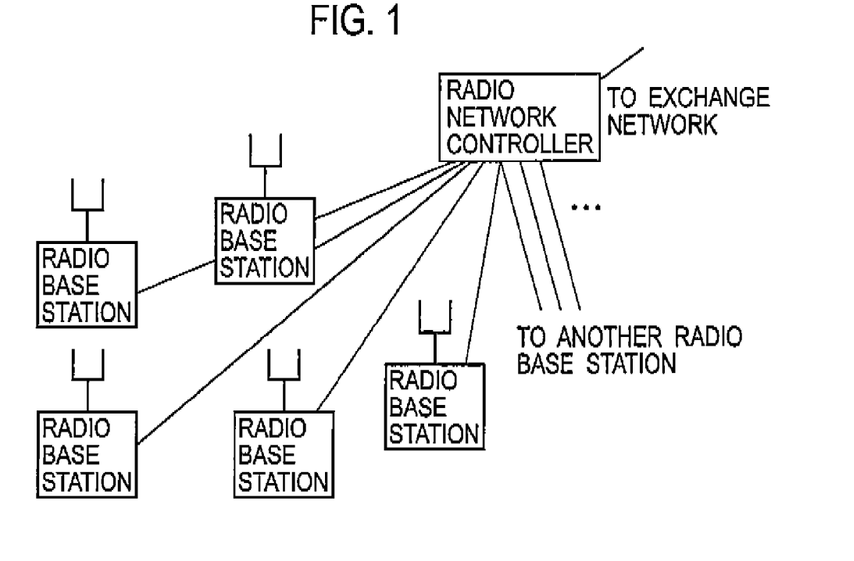
FIG. 1 is an overall configuration diagram of a general mobile communication system.

However, as shown in FIG. 1, a radio network controller integrally controls a plurality of radio base stations in general. Therefore, in the conventional mobile communication system, there has been a problem that it is difficult to perform fast control for changing the transmission rate of uplink user data (for example, per approximately 1 through 100 ms), due to the increase of processing load and processing delay in the radio network controller.

In addition, in the conventional mobile communication system, there has been also a problem that costs for implementing an apparatus and for operating a network are substantially increased even when the fast control for changing the transmission rate of the uplink user data can be performed.

Figure 2A:
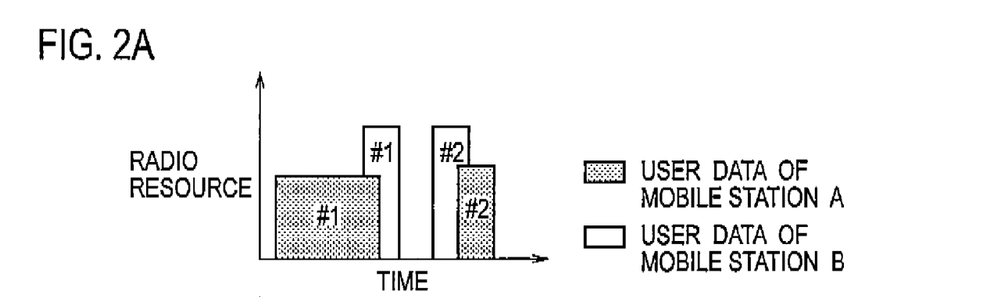
FIG. 2 is a view for explaining an uplink transmission rate control method in a mobile communication system according to a conventional technique.
Figure 2B:
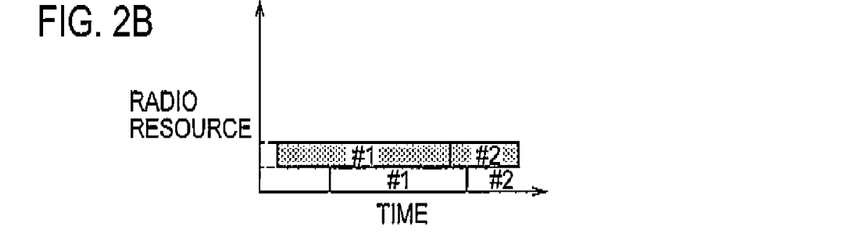
Figure 2C:
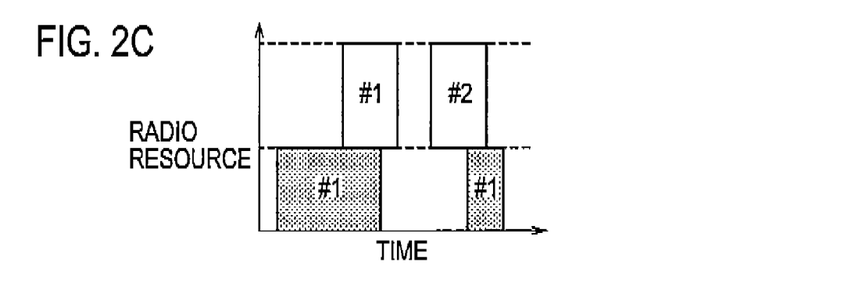

Accordingly, in the conventional mobile communication system, when a burst data transmission is performed as shown in FIG. 2A, the data is transmitted by accepting low-speed, high-delay, and low-transmission efficiency as shown in FIG. 2B, or by reserving radio resources for high-speed communications so as to accept the radio bandwidth resources in an unoccupied state and hardware resources in the radio base station Node B are wasted, as shown in FIG. 2C.

In each of FIGS. 2B and 2C, "radio resource" on the vertical axis refers to both of the radio band resource and the hardware resource mentioned above. Hereinafter, a radio band resource and a hardware resource are collectively referred to as a "radio resource".

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2), between the radio base station Node B and the mobile station UE, so as to utilize the uplink radio resources effectively. Such discussions or discussed functions will be hereinafter referred to as "Enhanced Uplink (EUL)".

Hereinbelow, an example will be given for a control method of a radio resource (i.e., a transmission rate of uplink user data) for transmitting the uplink user data, which has been discussed in the "enhanced uplink".

In this control method, a radio base station NodeB is configured to assign, to each of mobile stations UE at a predetermined timing (TTI: transmission time interval), a radio resource to be used for transmitting the uplink user data from the mobile stations UE.

Here, the radio base station NodeB is configured to notify, to each of the mobile stations UE by using an enhanced absolute grant channel (E-AGCH), an absolute grant (AG) corresponding to the radio resource to be assigned to each of the mobile stations UE.

The radio base station NodeB is also configured to notify, to each of the mobile stations UE, a relative grant (RG), which indicates changes (UP/DOWN/HOLD) in a transmission rate of the uplink user data corresponding to the radio resource assigned to each of the mobile stations UE. The radio base station NodeB transmits the RG by use of an enhanced-relative grant channel (E-RGCH).

Figure 3:
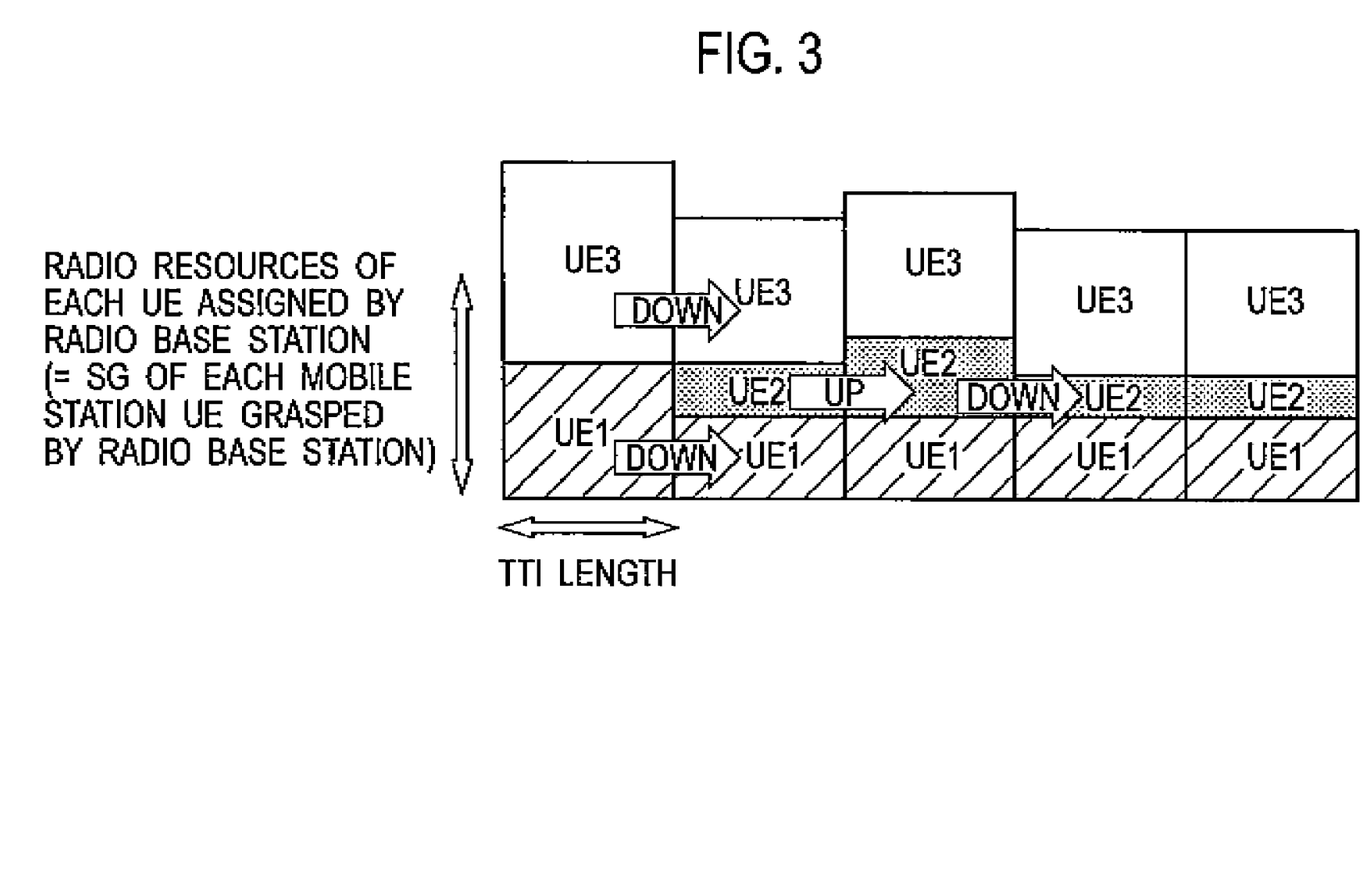
FIG. 3 is a view for explaining the uplink transmission rate control method in the mobile communication system according to the conventional technique.

Specifically, as shown in FIG. 3, the radio base station NodeB is configured to notify, to each of the mobile stations UE1 to UE3, an SG corresponding to the radio resources assigned to each of the mobile stations UE1 to UE3, by use of an AG (granted value) or an RG (UP/DOWN/HOLD) through the E-AGCH or the E-RGCH.

Note that, in each TTI (sub-frame), the radio base station NodeB is configured to send a notification of the AG or the RG only to the mobile station allowed to transmit the uplink user data through an enhanced-dedicated physical data channel (E-DPDCH).

Here, when the mobile stations UE1 to UE3 are not notified of the AG nor the RC, the mobile stations UE1 to UE5 continuously use the current SG. Note that, in a general mobile communication system, the SG assigned to the mobile stations UE1 to UE3 is set to be the same value for a period of several 10 ms to several 100 ms, in many cases.

A related technique is disclosed in Japanese Patent Publication No. 2007-274322.

However, the mobile communication system employing the "EUL" method as described above has the following problem. Detailed description will be given by referring to FIG. 4. In the mobile station UE3 of FIG. 4, transmission of uplink user data is completed in the sub-frame #2, and assigned radio resources are not used in the sub-frame #3 and #4. Thereafter, uplink user data to be transmitted is generated again in a sub-frame #5. In such case, a transmission power for transmitting an E-DPDCH from the mobile station UE is drastically increased during switching from the sub-frame #4 to the sub-frame #5. Accordingly, reception characteristics of the radio base station NodeB are deteriorated. Moreover, the dispersion of a received total wideband power (RTWP) measured at the radio base station NodeB is increased; thereby a measurement error becomes large.

Figure 4:
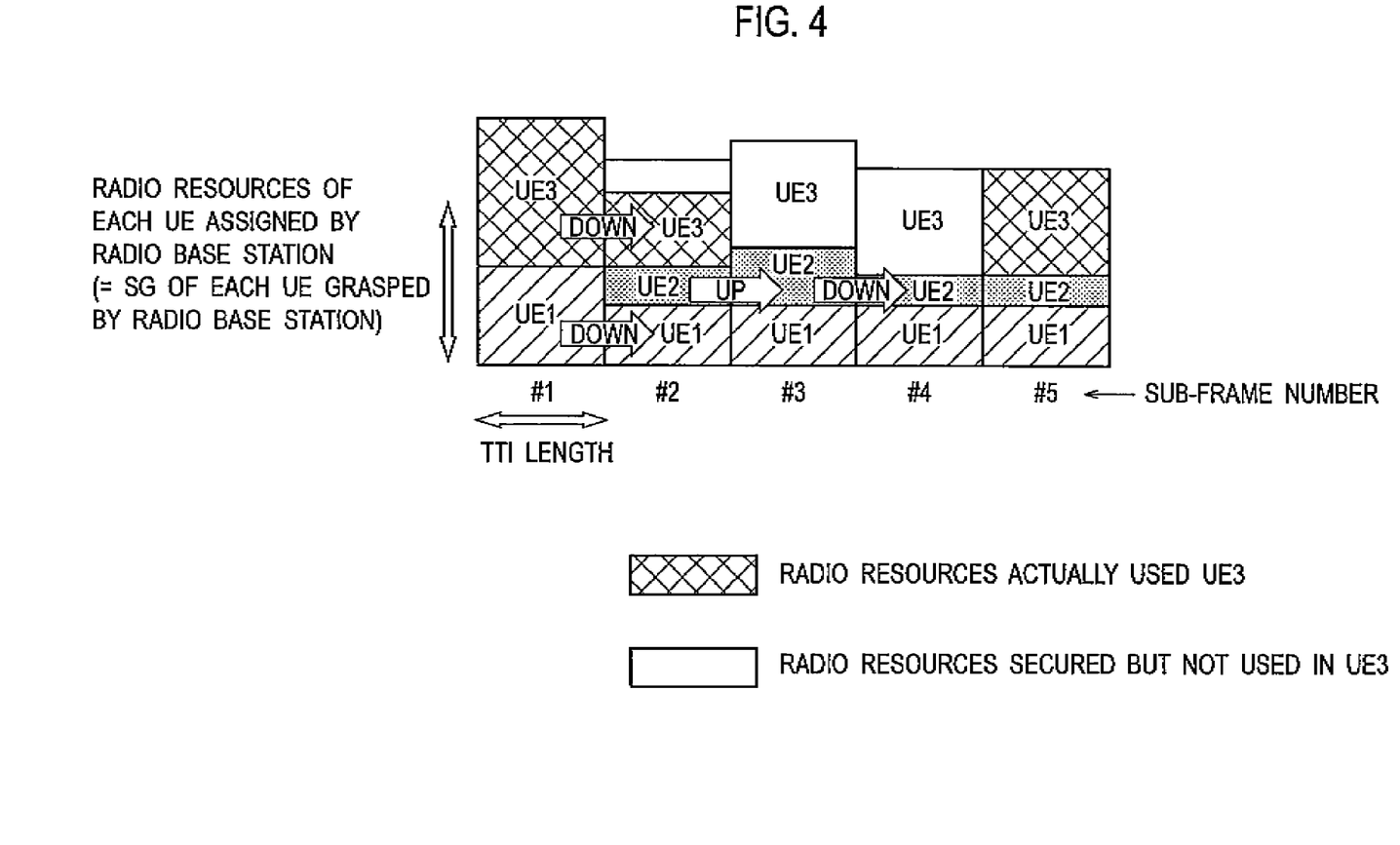
FIG. 4 is a view for explaining the uplink transmission rate control method in the mobile communication system according to the conventional technique.

Moreover, the radio resources assigned to the mobile station UE3 in the sub-frames #3 and #4 are excessive, and these radio resources are wasted since these radio resources cannot be used by the mobile stations UE1 and UE2.

SUMMARY OF THE INVENTION

A first aspect of the present invention is summarized as a transmission rate control method in which a radio base station controls a transmission rate of uplink user data to be transmitted from a mobile station, including: notifying, from the mobile station to the radio base station, at a predetermined timing, a happy bit set to a first value, when the mobile station determines that a buffering time during which the uplink user data is buffered in a transmission buffer does not exceed a predetermined time, assuming that the mobile station continues to use a transmission rate corresponding to a current granted value notified by the radio base station; determining, at the radio base station, a maximum granted value that can be notified to the mobile station, in accordance with the happy bit notified from the mobile station; calculating, at the radio base station, as an allowable value to be notified to the mobile station, a granted value not more than the maximum granted value; notifying, from the radio base station to the mobile station, the granted value calculated at the radio base station, by using a transmission rate control channel; and transmitting, from the mobile station, the uplink user data, at a transmission rate corresponding to the granted value notified from the radio base station.

In the first aspect of the invention, in the determining, the radio base station may determine the maximum granted value that can be notified to the so mobile station, in accordance with an average value of happy bit notified, within a predetermined time period, from the mobile station.

In the first aspect of the invention, in the notifying, the mobile station may notify, to the base station, a happy bit set to a second value, when the mobile station determines that the buffering time during which the uplink user data is buffered in the transmission buffer exceeds the predetermined time, assuming that the mobile station continues to use the transmission rate corresponding to the current granted value notified by the radio base station, and when the mobile station determines that the uplink user data can be transmitted at a transmission rate higher than the transmission rate corresponding to the current granted value.

In the first aspect of the invention, in the determining, the radio base station may determine the maximum granted value, when the radio base station determines to notify, to the mobile station, a granted value larger than the current granted value.

In the first aspect of the invention, the radio base station may determine not to notify, to the mobile station, the granted value larger than the current granted value, when a monitoring timer is not terminated.

A second aspect of the invention is summarized as a transmission rate control method in which a radio base station controls a transmission rate of uplink user data to be transmitted from a mobile station, including: notifying, from the mobile station to the radio base station, at a predetermined timing, a happy bit set to a first value, when the mobile station determines that a buffering time during which the uplink user data is buffered in a transmission buffer does not exceed a predetermined time, assuming that the mobile station continues to use a transmission rate corresponding to a current granted value notified by the radio base station; determining, at the radio base station, a maximum allowable increment for the current granted value being notified to the mobile station, in accordance with the happy bit notified from the mobile station; calculating, at the radio base station, as an allowable value to be notified to the mobile station, a granted value obtained by increasing the current granted value by an increment amount not more than the maximum allowable increment amount; notifying, from the radio base station to the mobile station, the granted value calculated at the radio base station, by using a transmission rate control channel; and transmitting, from the mobile station, the uplink user data, at the transmission rate corresponding to the granted value notified from the radio base station.

In the second aspect of the invention, in the determining, the radio base station may determine the maximum allowable increment amount for the current granted value, in accordance with an average value of happy bit notified, within a predetermined time period, from the mobile station.

In the second aspect of the invention, in the notifying, the mobile station may notify, to the base station, a happy bit set to a second value, when the mobile station determines that the buffering time during which the uplink user data is buffered in the transmission buffer exceeds the predetermined time, assuming that the mobile station continues to use the transmission rate corresponding to the current granted value notified by the radio base station, and when the mobile station determines that the uplink user data can be transmitted at a transmission rate higher than the transmission rate corresponding to the current granted value.

In the second aspect of the invention, in the determining, the radio base station may determine the maximum granted value, when the radio base station determines to notify, to the mobile station, a granted value larger than the current granted value.

In the second aspect of the invention, the radio base station may determine not to notify, to the mobile station, the granted value larger than the current granted value, when a monitoring timer is not terminated.

A third aspect of the invention is summarized as a radio base station used in a mobile communication system in which a mobile station transmits uplink user data at a transmission rate corresponding to a granted value notified from the radio base station, including: a granted value determining unit configured to determine a maximum granted value that can be notified to the mobile station, in accordance with the happy bit notified from the mobile station, and to calculate, as an allowable value to be notified to the mobile station, a granted value not more than the maximum granted value; and a granted value notification unit configured to notify, to the mobile station, the granted value calculated by the granted value determining unit, by using a transmission rate control channel. The happy bit is set to a first value when the mobile station determines that a buffering time during which the uplink user data is buffered in a transmission buffer does not exceed a predetermined time, assuming that the mobile station continues to use a transmission rate corresponding to a current granted value notified by the radio base station.

In the third aspect of the invention, the granted value determining unit may determine the maximum granted value that can be notified to the mobile station, in accordance with an average value of happy bit notified, within a predetermined time period, from the mobile station.

In the third aspect of the invention, the happy bit may be set to a second value when the mobile station determines that the buffering time during which the uplink user data is buffered in the transmission buffer exceeds the predetermined time, assuming that the mobile station continues to use the transmission rate corresponding to the current granted value notified by the radio base station, and when the mobile station determines that the uplink user data can be transmitted at a transmission rate higher than the transmission rate corresponding to the current granted value.

In the third aspect of the invention, the granted value determining unit may determine the maximum granted value, when the radio base station determines to notify, to the mobile station, a granted value larger than the current granted value.

In the third aspect of the invention, the granted value determining unit may determine not to notify, to the mobile station, the granted value larger than the current granted value, when a monitoring timer is not terminated.

A fourth aspect of the invention is summarized as a radio base station used in a mobile communication system in which a mobile station transmits uplink user data at a transmission rate corresponding to a granted value notified from the radio base station, including: a granted value determining unit configured to determine a maximum allowable increment amount for a current granted value being notified to the mobile station, in accordance with the happy bit notified from the mobile station, and to calculate, as an allowable value to be so notified to the mobile station, a granted value obtained by increasing the current granted value by an increment amount not more than the maximum allowable increment amount; and a granted value notification unit configured to notify, to the mobile station, the granted value calculated by the granted value determining unit, by using a transmission rate control channel. The happy bit is set to a first value when the mobile station determines that a buffering time during which the uplink user data is buffered in a transmission buffer does not exceed a predetermined time, assuming that the mobile station continues to use a transmission rate corresponding to a current granted value notified by the radio base station.

In the fourth aspect of the invention, the granted value determining unit may determine the maximum granted value that can be notified to the mobile station, in accordance with an average value of happy bit notified, within a predetermined time period, from the mobile station.

In the fourth aspect of the invention, the happy bit may be set to a second value when the mobile station determines that the buffering time during which the uplink user data is buffered in the transmission buffer exceeds the predetermined time, assuming that the mobile station continues to use the transmission rate corresponding to the current granted value notified by the radio base station, and when the mobile station determines that the uplink user data can be transmitted at a transmission rate higher than the transmission rate corresponding to the current granted value.

In the fourth aspect of the invention, the granted value determining unit may determine the maximum granted value, when the radio base station determines to notify, to the mobile station, a granted value larger than the current granted value.

In the fourth aspect of the invention, the granted value determining unit may determine not to notify, to the mobile station, the granted value larger than the current granted value, when a monitoring timer is not terminated.

DETAILED DESCRIPTION OF THE PREFERRED EMBODIMENTS

Configuration of a Mobile Communication System According to a First Embodiment of the Present Invention With reference to FIGS. 5 to 7, description will be given of a configuration of a mobile communication system according to a first embodiment of the present invention.

In the mobile communication system according to this embodiment, each of the mobile station UE is configured to transmit uplink user data at a transmission rate corresponding to an AG (granted value). The AG is notified through an E-AGCH from a radio base station NodeB.

Figure 5:
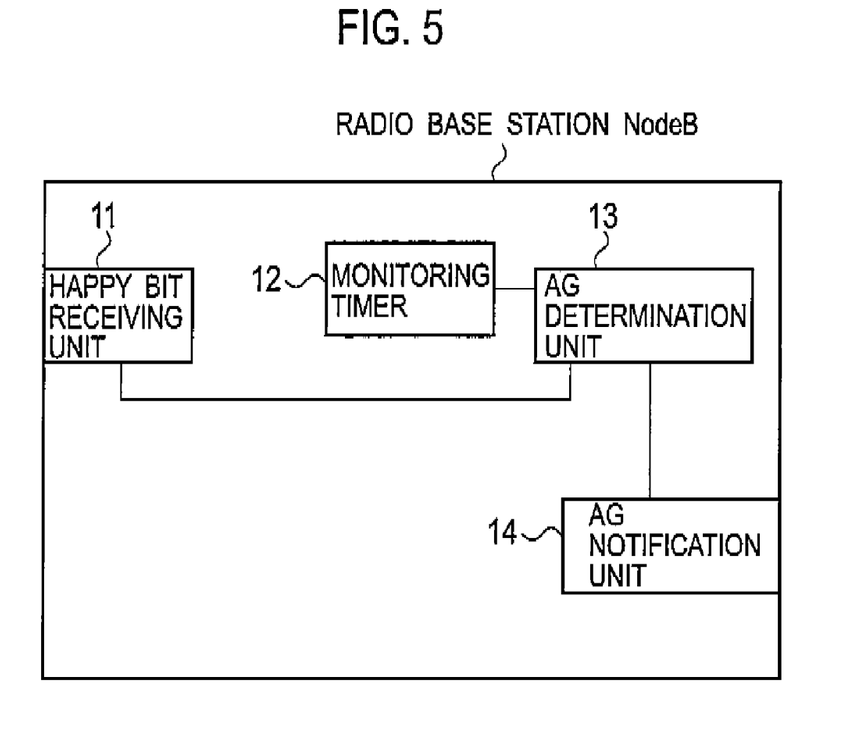
FIG. 5 is a functional block diagram showing a radio base station according to a first embodiment of the present invention.

As shown in FIG. 5, the radio base station NodeB according to this embodiment includes a happy bit receiving unit 11, a monitoring timer 12, an AG determining unit 13 and an AG notification unit 14.

The happy bit receiving unit 11 is configured to receive the happy bit from the mobile station UE.

Here, the mobile station UE is configured to transmit a happy bit on an E-DPCCH (enhanced-dedicated physical control channel) at a predetermined timing (specifically, at a time of transmitting an E-DCH (enhanced-dedicated channel)).

In addition, the mobile station UE is configured to notify, to the radio base station NodeB, a happy bit set to "happy: 1 (first value)" when the mobile station UE determines that a buffering time during which the uplink user data is buffered in a transmission buffer does not exceed a predetermined time, assuming that the mobile station continues to use a transmission rate corresponding to a current granted value (AG) notified by the radio base station NodeB.

Moreover, the mobile station UE may be configured to notify, to the radio base station NodeB, a happy bit set to a second value when the mobile station UE determines that the buffering time during which the uplink user data buffered in the transmission buffer exceeds the predetermined time, assuming that the mobile station continues to use a transmission rate corresponding to a current granted value (AG) notified by the radio base station NodeB, and when the mobile station UE determines that the uplink user data can be transmitted at a transmission rate higher than the transmission rate corresponding to the current granted value (AG).

For example, the mobile station UE may be configured to notify, to the radio base station NodeB, the happy bit set to "unhappy: 0 (second value)" if the criteria defined in subclause 11.8.1.5 of TS25.321 V7.0.0 of the 3GPP standard are met.

Moreover, the mobile station UE may be configured to notify, to the radio base station NodeB, the happy bit set to "happy: 1 (first value)" if the criteria defined in subclause 11.8.1.5 of TS25.321 V7.0.0 of the 3GPP standard are not met.

The monitoring timer 12 is started when a current granted value (AG) assigned to the mobile station UE is increased, and is terminated after a lapse of a predetermined time. The monitoring timer 12 may be provided individually for each mobile station UE or may be shared among multiple mobile stations UE.

The AG determining unit 13 is configured to determine the "maximum AG value (maximum granted value), in accordance with the happy bit received from the mobile station UE." Here, the "maximum AG value" can be notified to each of the mobile station UE. Further, the AG determining unit 13 is configured to calculate, as an AG to be notified to the mobile station UE, an AG (granted value) not more than the "maximum AG value (maximum granted value)."

To be more specific, the AG determining unit 13 may determine the maximum AG value (maximum granted value) that can be notified to the mobile station UE, in accordance with the average value of the happy bit notified by the mobile station UE Here, the maximum value and the minimum value of the average value of the happy bit are "1" and "0," respectively.

Figure 6:
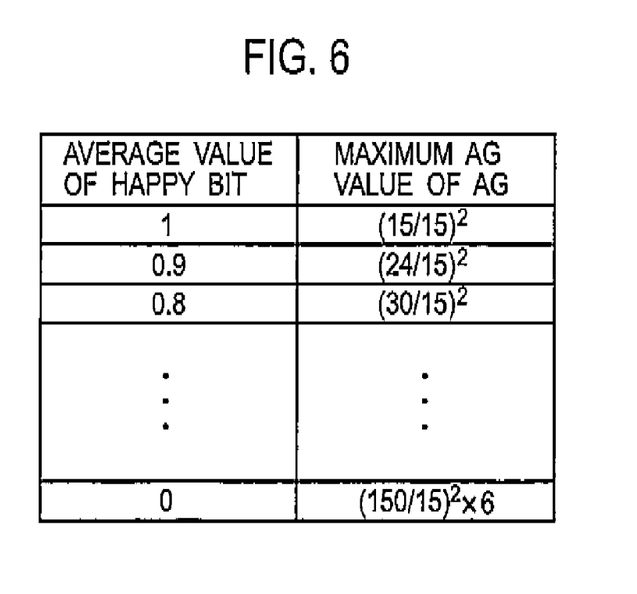
FIG. 6 is a diagram showing an example of correspondences between "average values of happy bit" and "maximum AG values" both stored in a storage unit in the radio base station according to the first embodiment of the present invention

For example, the AG determination unit 13 manages a table shown in FIG. 6. Then, with reference to this table, the AG determination unit 13 determines, as the maximum AG value (maximum granted value) that can be notified to the mobile station UE, the "Maximum AG value" corresponding to the average value of the happy bit notified within the predetermined time period from the mobile station UE.

Then, the AG determining unit 13 determines the AG value (X) that can be notified to the mobile station UE, in consideration of available radio resources and the like. Then, the AG determining unit 13 compares the AG value (X) and the Maximum AG value (Y) so as to determine a smaller one to be an AG to be notified to the mobile station UE.

Moreover, the AG determining unit 13 may be configured to determine the maximum AG value (maximum granted value), when the AG determining unit 13 determines to notify the AG (granted value) larger than the AG (granted value) currently assigned to the mobile station UE.

Furthermore, the AG determining unit 13 may determine not to notify AG (granted value) larger than the current AG (granted value) notified to the mobile station UE unless the monitoring timer 12 is terminated.

The AG notification unit 14 is configured to notify the calculated AG (granted value) to the mobile station UE by using an E-AGCH (transmission rate control channel).

Specifically, the AG notification unit 14 is configured to transmit, to the mobile station UE, an E-AGCH including "Index" corresponding to the "AG value" calculated as the AG (granted value) to be notified to the mobile station UE. Here, the "AG value" is calculated on the basis of a table associating "Index" with "AG value" shown in FIG. 7 (the table defined in 3GPP TS25.212 V7.0.0.)

(Operation of Mobile Communication System According to First Embodiment of the Present Invention)

Operations of the radio base station NodeB according to the first embodiment of the present invention will be described with reference to FIG. 8.

Figure 8:
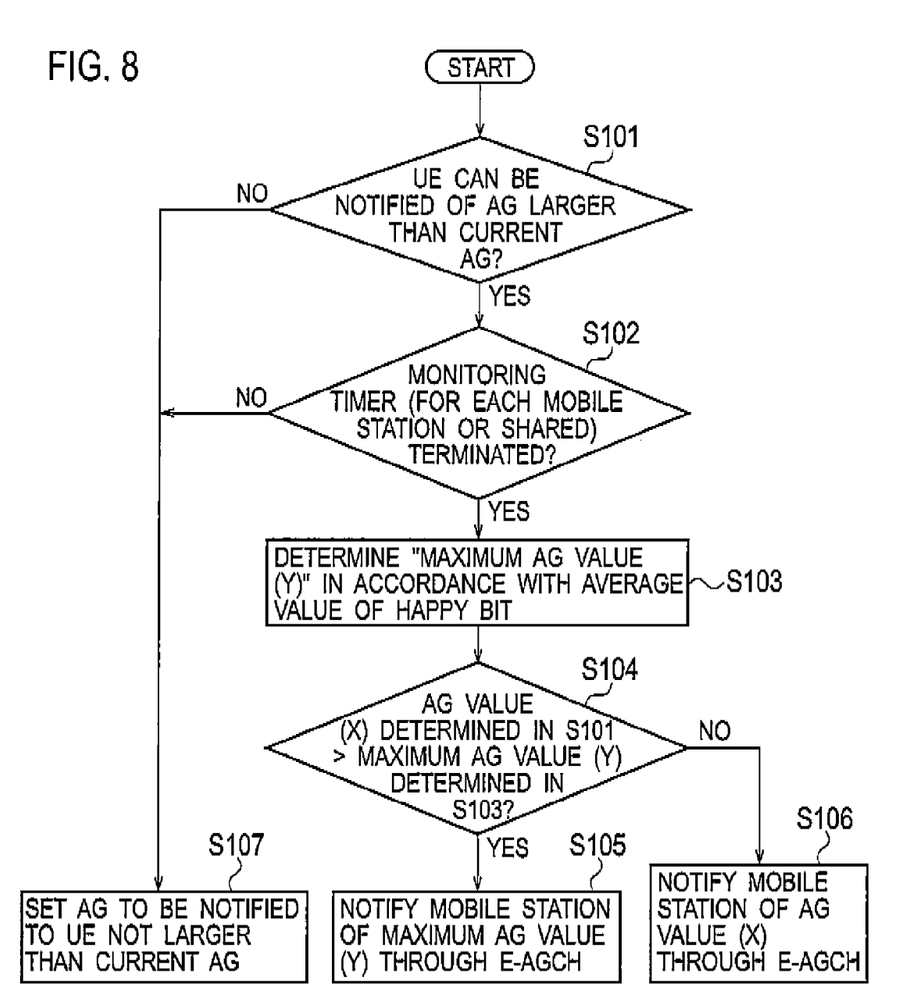
FIG. 8 is a flowchart showing operations of the radio base station according to the first embodiment of the present invention.

As shown in FIG. 8, in step S101, in consideration of available radio resources and the like, the radio base station NodeB determines whether or not an AG larger than the currently-notified AG can be notified to the mobile station UE.

When the radio base station NodeB determines the result in Step S101 is positive (YES), in Step S102, the radio base station NodeB determines whether or not the monitoring timer 12 (a monitoring timer for the mobile station or a shared monitoring timer) is terminated.

When the radio base station NodeB determines the result in Step S101 is negative (NO), in Step S107, the radio base station NodeB determines not to set an SG of the mobile station UE to be larger than the current SG. Therefore, the radio base station NodeB does not notify the mobile station UE of the AG larger than the AG currently notified to the mobile station UE.

When the radio base station NodeB determines the result in Step S102 is negative (NO), in Step S107, the radio base station NodeB determines not to set the SG of the mobile station UE to be larger than the current SG. Therefore, the radio base station NodeB does not notify the mobile station UE of the AG larger than the AG currently notified to the mobile station UE.

When the radio base station NodeB determines the result in Step S102 is positive (YES), in Step S103, the radio base station NodeB determines a maximum AG value (Y) that can be notified to the mobile station UE, in accordance with the average value of the happy bit notified, within the predetermined time period, from the mobile station UE.

In Step S104, the radio base station NodeB compares an AG value (X) determined in Step S101, with the maximum AG value (Y) determined in Step S103.

When the AG value (X) is larger than the maximum AG value (Y), in Step S105, the radio base station NodeB notifies, to the mobile station UE, the maximum AG value (Y) through an E-AGCH.

On the other hand, when the AG value (X) is not larger than the maximum AG value (Y), in Step S106, the radio base station NodeB notifies, to the mobile station UE, the AG value (X) through the E-AGCH.

(Operations and Effects of Mobile Communication System according to First Embodiment of the Invention)

The mobile communication system of this embodiment makes it possible to avoid a drastic increase of the transmission power of the E-DPDCH transmitted from the mobile station UE, in a mobile communication system to which an "EUL" method is applied. Accordingly, the mobile communication system according to this embodiment can solve problems caused by such drastic increase of the transmission power of the E-DPDCH.

Moreover, the mobile communication system according to this embodiment enables effective utilization of radio resources by reducing excessively occupied radio resources and by properly securing the radio resources.

(Mobile Communication System According to Second Embodiment of Present Invention)

A mobile communication system according to a second embodiment of the present invention will be described with reference to FIGS. 9 to 11. Hereinafter, the description will be given mainly for differences between the mobile communication system according to this embodiment and the aforementioned mobile communication system according to the first embodiment.

In this embodiment, the AG determining unit 13 is configured to determine a maximum allowable increment amount (maximum allowable increment amount of AG) for the current granted value (AG) being notified to the mobile station UE, in accordance with the happy bit notified from the mobile station UE. Further, the AG determination unit 13 is configured to calculate a maximum allowable value that can be notified to the mobile station UE, by increasing the current AG (granted value) by an increment amount not more than the maximum allowable increment amount of AG.

Here, the AG determining unit 13 may be configured to determine the maximum allowable increment amount (maximum allowable increment amount of AG) for the current granted value (AG) notified to the mobile station UE, in accordance with the average value of the happy bit notified from the mobile station UE.

Figure 9:
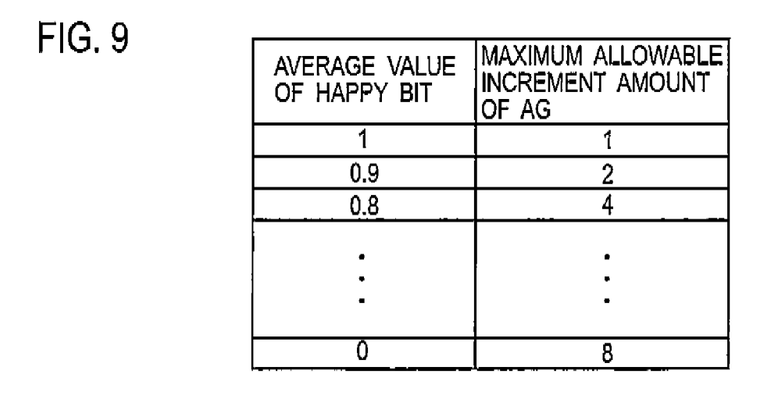
FIG. 9 is a diagram showing an example of correspondences between "average values of happy bit" and "maximum allowable increment amounts of AG" both stored in a storage unit in a radio base station according to a second embodiment of the present invention.

More specifically, as shown in FIG. 9, the AG determining unit 13 determines the "maximum allowable increment amount of AG" corresponding to the average value of the happy bit (happy bit average value) notified, within the predetermined time period, from the mobile station UE, as the maximum allowable increment amount (maximum allowable increment amount of AG) for the current AG (granted value) being notified to the mobile station UE.

Figure 7:
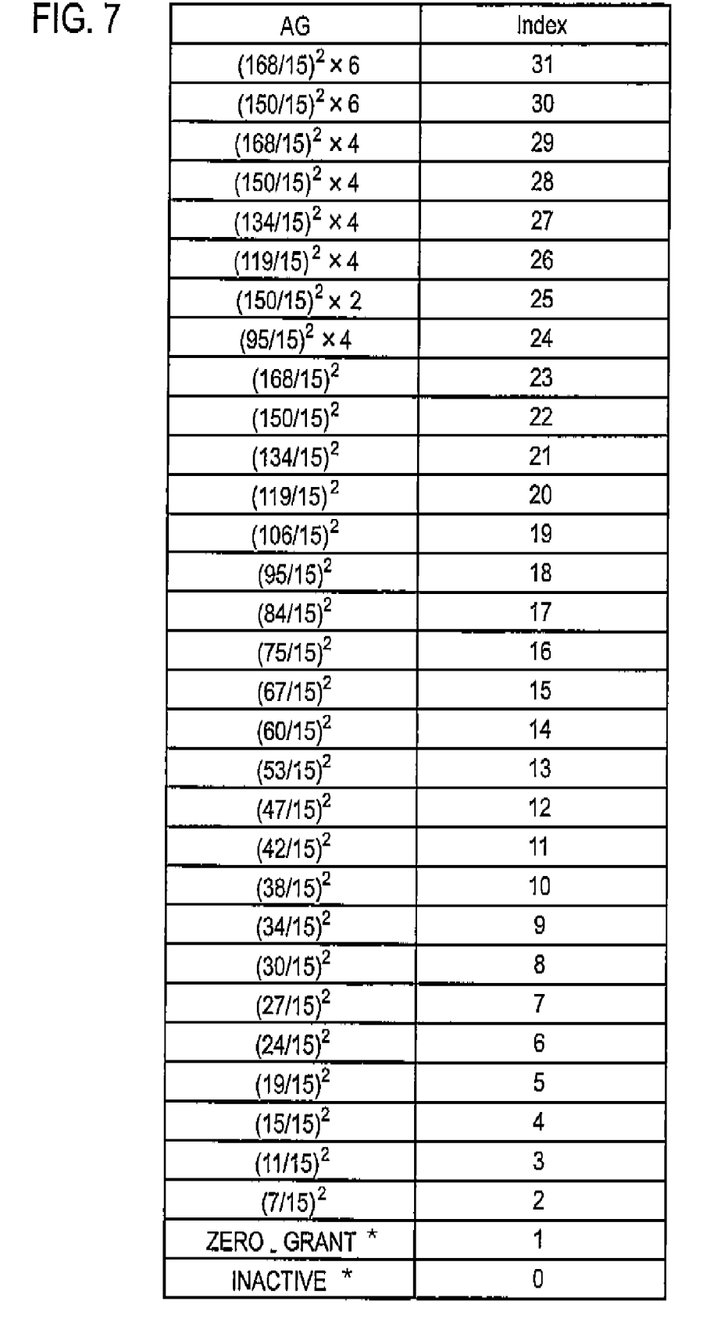
FIG. 7 is a diagram showing one example of correspondences between "AGs" and "Indexes" defined in 3SGPP TS25.212 V7.0.0.

Incidentally, the "Maximum allowable increment amount of AG" may be defined as a difference in the "AGs" (for example, "$(5/15)^2$") in the table shown in FIG. 7, or may be defined as a difference in the "Indexes" (for example, "1") in the table shown in FIG. 7.

Then, the AG determination unit 13 determines the AG value (X) that can be notified to the mobile station UE, in consideration of the available radio resources and the like. Then, the AG determination unit 13 compares the AG value (X) and the AG value (Y) calculated by increasing the current AG (granted value) by an increment amount not more than the maximum allowable increment amount of AG, so as to determine a smaller one to be an AG to be notified to the mobile station UE.

Here, the AG determination unit 13 is configured to determine the AG value (Y) as the maximum AG value not more than the value calculated by increasing the current AG (granted value) by the maximum allowable increment amount of AG, among the AG values in the table shown in FIG. 7.

For example, when the value obtained by increasing the current AG (granted value) by the aforementioned maximum allowable increment amount of AG in FIG. 7 is "$(100/15)^2$," the AG value (Y) is "$(95/15)^2$."

Here, consider a case where the maximum allowable increment amount (Maximum allowable increment amount of AG) is defined as a difference in the "AGs" in the example shown in FIGS. 7 and 9. Here, when the current AG is "$(11/15)^2$" and the average value of the happy bit is "1," the value obtained by increasing the current AG (granted value) by the maximum allowable increment amount of AG is "$18.6 \ldots (=\sqrt{(11^2+15^2)/15})^2$", and the AG value (Y) is "$(15/15)^2$."

On the other hand, consider a case where the maximum allowable increment amount (Maximum allowable increment amount of AG) is defined as the difference in the "Indexes" in the example shown in FIGS. 7 and 9. Here, when the current AG is "$(11/15)^2$" and the average value of the happy bit is "1," both of the AG value (Y) and the value obtained by increasing the current AG (granted value) by the aforementioned maximum allowable increment amount of AG and are "$(15/15)^2$."

Figure 10:
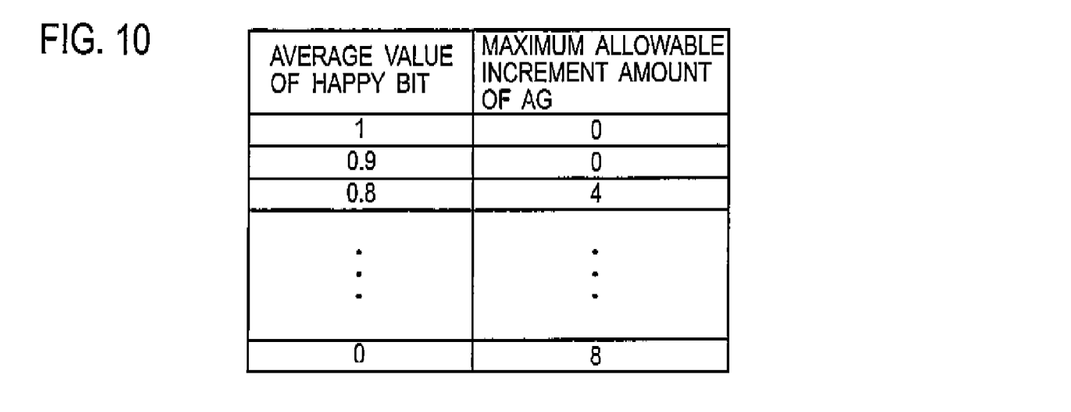
FIG. 10 is a diagram showing an example of correspondences between "average value of happy bit" and "maximum allowable increment amounts of AG" both stored in a storage unit in a radio base station according to a second embodiment of the present invention

In addition, the "maximum allowable increment amount of AG" corresponding to the "Average value of happy bit" of "1" and "0.9" as shown in FIG. 10 is set to "0". In this case, when Average value of happy bit is larger than a predetermined threshold ("0.8" in the example in FIG. 10), the AG determining unit 13 may determine not to notify, to the mobile station UE, an AG (granted value) larger than the current AG (granted value)

Moreover, the AG determination unit 13 may be configured to determine the maximum allowable increment amount of AG when an AG (granted value)

So larger than the current AG (granted value) assigned to the mobile station UE is determined to be notified.

Next, operations of the radio base station NodeB according to this embodiment will be described with reference to FIG. 11.

Figure 11:
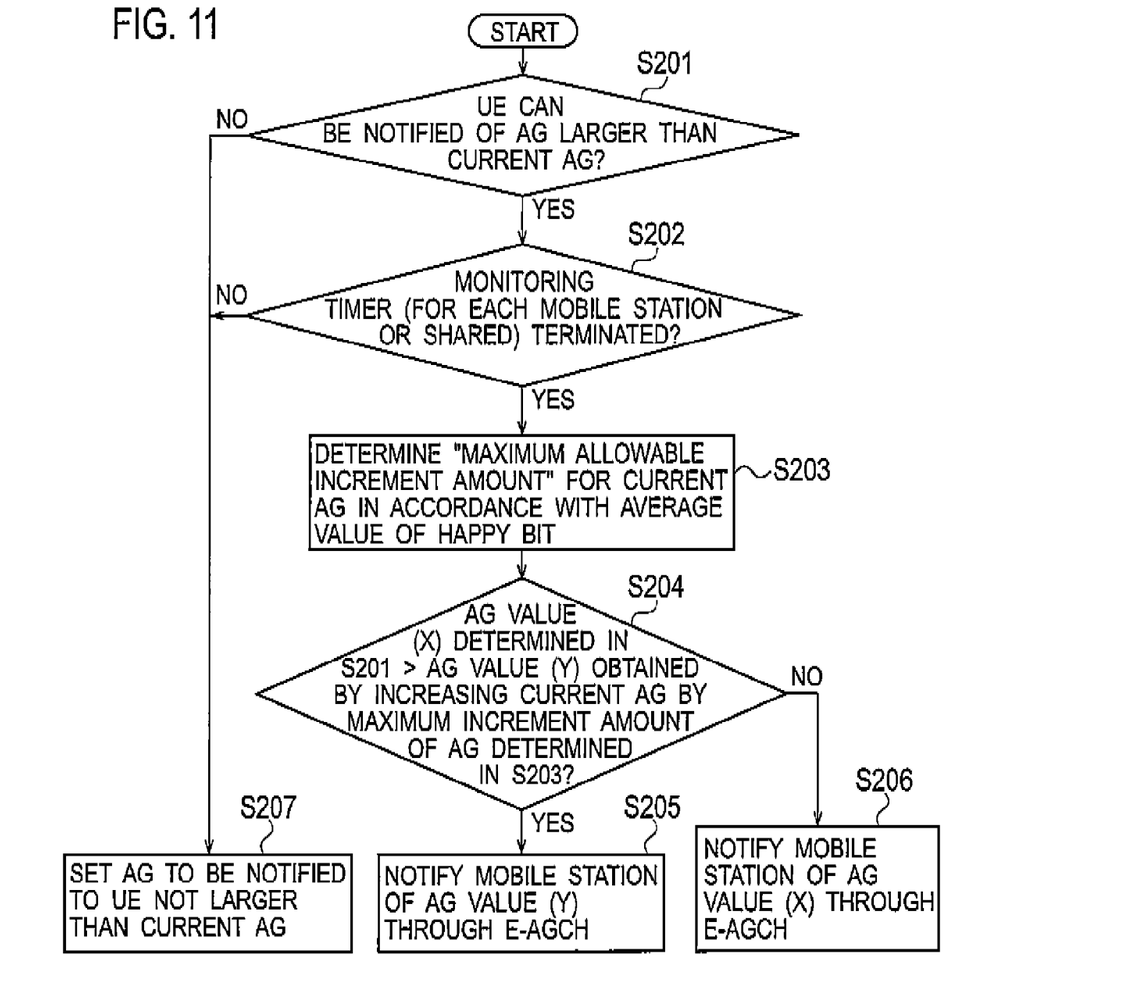
FIG. 11 is a flowchart showing operations of the radio base station according to the second embodiment of the present invention.

As shown in FIG. 11, in step S201 in consideration of available radio resources and the like, the radio base station NodeB determines whether or not an AG larger than the currently-notified AG can be notified to the mobile station UE.

When the radio base station NodeB determines the result in Step S201 is negative (NO), in Step S207, the radio base station NodeB determines not to set an SG of the mobile station UE to be larger than the current SG. Therefore, the radio base station NodeB does not notify the mobile station UE of the AG larger than the AG currently notified to the mobile station UE.

When the radio base station NodeB determines the result in Step S201 is positive (YES), in Step S202, the radio base station NodeB determines whether or not the monitoring timer 12 (a monitoring timer for the mobile station or a shared monitoring timer) is terminated.

When the radio base station NodeB determines the result in Step S202 is negative (NO), in Step S207, the radio base station NodeB determines not to set the SG of the mobile station UE to be larger than the current SG. Therefore, the radio base station NodeB does not notify the mobile station UE of the AG larger than the AG currently notified to the mobile station UE.

When the radio base station NodeB determines the result in Step S202 is positive (YES), in Step S203, the radio base station NodeB determines a maximum allowable increment amount for the AG currently be notified to the mobile station, in accordance with the average value of the happy bit notified, within the predetermined time period, from the mobile station UE.

In Step S204, the radio base station NodeB compares an AG value (X) determined in step S201 with the AG value (Y) calculated by increasing the current AG by the maximum allowable increment amount of AG determined in Step S203.

When the AG value (X) is larger than the AG value (Y), in Step S205, the radio base station NodeB notifies, to the mobile station UE, the AG value (Y) so through the E-AGCH.

On the other hand, when the AG value (X) is not larger than the AG value (Y) in Step S206, the radio base station NodeB notifies, to the mobile station UE, the AG value (X) through the E-AGCH.

Note that the operations of the mobile station UE and radio base station NodeB described above may be implemented by hardware, by a software module executed by a processor, or by a combination of both.

The software module may be provided in any form of storage medium such as a random access memory (RAM), a flash memory, a read only memory (ROM), an erasable programmable ROM (EPROM), an electronically erasable and programmable ROM (EEPROM), a register, a hard disk, a removable disk and a CD-ROM.

Such a storage medium is connected to the processor so that the processor can read and write information from and into the storage medium. Moreover, the storage medium may be integrated in the processor. Furthermore, the storage medium and the processor may be provided in an ASIC. The ASIC may be provided in a mobile station UE and a radio base station eNodeB. Moreover, the storage medium and the processor may be provided as discrete components in the mobile station UE and the radio base station eNodeB.

Hereinabove, the present invention has been described in detail by use of the embodiment. However, it is obvious to those skilled in the art that the present invention is not limited to the embodiment described herein. The present invention may be implemented as a modification and a variation, within the spirit and scope of the present invention defined by the scope of claims. Accordingly, the present specification aims to provide an exemplar description and does not limit the present invention in any way.

What is claimed is:

1. A transmission rate control method in which a radio base station controls a transmission rate of uplink user data to be transmitted from a mobile station, comprising:
    notifying, from the mobile station to the radio base station, at a predetermined timing, a happy bit set to a first value, when the mobile station determines that a buffering time during which the uplink user data is buffered in a transmission buffer does not exceed a predetermined time, assuming that the mobile station continues to use a transmission rate corresponding to a current granted value notified by the radio base station;
    determining, at the radio base station, a maximum granted value that can be notified to the mobile station, in accordance with the happy bit notified from the mobile station;
    calculating, at the radio base station, as an allowable value to be notified to the mobile station, a granted value not more than the maximum granted value;
    notifying, from the radio base station to the mobile station, the granted value calculated at the radio base station, by using a transmission rate control channel;
    transmitting, from the mobile station, the uplink user data, at a transmission rate corresponding to the granted value notified from the radio base station; and
    wherein in the determining, the radio base station determines the maximum granted value that can be notified to the mobile station, in accordance with an average value of happy bit notified, within a predetermined time period, from the mobile station.

2. The transmission rate control method according to claim 1, wherein
    in the notifying, the mobile station notifies, to the base station, a happy bit set to a second value, when the mobile station determines that the buffering time during which the uplink user data is buffered in the transmission buffer exceeds the predetermined time, assuming that the mobile station continues to use the transmission rate corresponding to the current granted value notified by the radio base station, and when the mobile station determines that the uplink user data can be transmitted at a transmission rate higher than the transmission rate corresponding to the current granted value.

3. The transmission rate control method according to claim 1, wherein,
    in the determining, the radio base station determines the maximum granted value, when the radio base station determines to notify, to the mobile station, a granted value larger than the current granted value.

4. The transmission rate control method according to claim 3, wherein
    the radio base station determines not to notify, to the mobile station, the granted value larger than the current granted value, when a monitoring timer is not terminated.

5. A transmission rate control method in which a radio base station controls a transmission rate of uplink user data to be transmitted from a mobile station, comprising:
    notifying, from the mobile station to the radio base station, at a predetermined timing, a happy bit set to a first value, when the mobile station determines that a buffering time during which the uplink user data is buffered in a transmission buffer does not exceed a predetermined time, assuming that the mobile station continues to use a transmission rate corresponding to a current granted value notified by the radio base station;
    determining, at the radio base station, a maximum allowable increment for the current granted value being notified to the mobile station, in accordance with the happy bit notified from the mobile station;
    calculating, at the radio base station, as an allowable value to be notified to the mobile station, a granted value obtained by increasing the current granted value by an increment amount not more than the maximum allowable increment amount;
    notifying, from the radio base station to the mobile station, the granted value calculated at the radio base station, by using a transmission rate control channel;
    transmitting, from the mobile station, the uplink user data, at the transmission rate corresponding to the granted value notified from the radio base station; and
    wherein in the determining, the radio base station determines the maximum allowable increment amount for the current granted value, in accordance with an average value of happy bit notified, within a predetermined time period, from the mobile station.

6. The transmission rate control method according to claim 5, wherein
    in the notifying, the mobile station notifies, to the base station, a happy bit set to a second value, when the mobile station determines that the buffering time during which the uplink user data is buffered in the transmission buffer exceeds the predetermined time, assuming that the mobile station continues to use the transmission rate corresponding to the current granted value notified by the radio base station, and when the mobile station determines that the uplink user data can be transmitted at a transmission rate higher than the transmission rate corresponding to the current granted value.

7. The transmission rate control method according to claim 5, wherein,
    in the determining, the radio base station determines the maximum granted value, when the radio base station determines to notify, to the mobile station, a granted value larger than the current granted value.

8. The transmission rate control method according to claim 7, wherein
    the radio base station determines not to notify, to the mobile station, the granted value larger than the current granted value, when a monitoring timer is not terminated.

9. A radio base station used in a mobile communication system in which a mobile station transmits uplink user data at a transmission rate corresponding to a granted value notified from the radio base station, comprising:
    a granted value determining unit configured to determine a maximum a granted value that can be notified to the mobile station, in accordance with the happy bit notified from the mobile station, and to calculate, as an allowable value to be notified to the mobile station, a granted value not more than the maximum granted value; and a granted value notification unit configured to notify, to the mobile station, the granted value calculated by the granted value determining unit, by using a transmission rate control channel, wherein the happy bit is set to a first value when the mobile station determines that a buffering time during which the uplink user data is buffered in a transmission buffer does not exceed a predetermined time, assuming that the mobile station continues to use a transmission rate corresponding to a current granted value notified by the radio base station; and wherein the granted value determining unit determines the maximum granted value that can be notified to the mobile station in accordance with an average value of happy bit notified, within a predetermined time period, from the mobile station.

10. The radio base station according to claim 9, wherein, the happy bit is set to a second value when the mobile station determines that the buffering time during which the uplink user data is buffered in the transmission buffer exceeds the predetermined time, assuming that the mobile station continues to use the transmission rate corresponding to the current granted value notified by the radio base station, and when the mobile station determines that the uplink user data can be transmitted at a transmission rate higher than the transmission rate corresponding to the current granted value.

11. The radio base station according to claim 9, wherein the granted value determining unit determines the maximum granted value, when the radio base station determines to notify, to the mobile station, a granted value larger than the current granted value.

12. The radio base station according to claim 11, wherein the granted value determining unit determines not to notify, to the mobile station, the granted value larger than the current granted value, when a monitoring timer is not terminated.

13. A radio base station used in a mobile communication system in which a mobile station transmits uplink user data at a transmission rate corresponding to a granted value notified from the radio base station, comprising:

a granted value determining unit configured to determine a maximum allowable increment amount for a current granted value being notified to the mobile station, in accordance with the happy bit notified from the mobile station, and to calculate, as an allowable value to be notified to the mobile station, a granted value obtained by increasing the current granted value by an increment amount not more than the maximum allowable increment amount; and a granted value notification unit configured to notify, to the mobile station, the granted value calculated by the granted value determining unit, by using a transmission rate control channel, wherein the happy bit is set to a first value when the mobile station determines that a buffering time during which the uplink user data is buffered in a transmission buffer does not exceed a predetermined time, assuming that the mobile station continues to use a transmission rate corresponding to a current granted value notified by the radio base station; and wherein the granted value determining unit determines the maximum granted value that can be notified to the mobile station, in accordance with an average value of happy bit notified, within a predetermined time period, from the mobile station.

14. The radio base station according to claim 13, wherein, the happy bit is set to a second value when the mobile station determines that the buffering time during which the uplink user data is buffered in the transmission buffer exceeds the predetermined time, assuming that the mobile station continues to use the transmission rate corresponding to the current granted value notified by the radio base station, and when the mobile station determines that the uplink user data can be transmitted at a transmission rate higher than the transmission rate corresponding to the current granted value.

15. The radio base station according to claim 13, wherein the granted value determining unit determines the maximum granted value, when the radio base station determines to notify, to the mobile station, a granted value larger than the current granted value.

16. The radio base station according to claim 15, wherein the granted value determining unit determines not to notify, to the mobile station, the granted value larger than the current granted values when a monitoring timer is not terminated.

* * * * *